(12) United States Patent
Kato (10) Patent No.: US 6,956,869 B1
(45) Date of Patent: Oct. 18, 2005

(54) DATA RECORDING AND/OR REPRODUCING APPARATUS, METHOD, AND SYSTEM AND RECORDING MEDIUM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/453,763

(22) Filed: Dec. 2, 1999

(30) Foreign Application Priority Data

Dec. 4, 1998 (JP) .......................................... 10-345947

(51) Int. Cl.$^7$ ........................... H04J 3/16; G01R 31/08; H04N 9/79; H04N 5/91
(52) U.S. Cl. ........................ 370/468; 370/232; 370/535; 386/6; 386/92
(58) Field of Search ................................ 370/468, 232, 370/477, 412, 535, 503, 518, 465, 464, 485, 486, 487, 507, 508; 348/500, 425.2, 512, 513, 537, 536, 419; 386/6, 46, 66, 92; 709/223, 229, 227

(56) References Cited

U.S. PATENT DOCUMENTS

| | | | | |
|---|---|---|---|---|
| 5,473,385 A | * | 12/1995 | Leske ......................... | 348/500 |
| 5,596,581 A | | 1/1997 | Saeijs et al. | |
| 5,619,337 A | | 4/1997 | Naimpally | |
| 5,844,636 A | | 12/1998 | Joseph et al. | |
| 5,901,149 A | * | 5/1999 | Itakura et al. ............... | 370/468 |
| 6,014,494 A | * | 1/2000 | Minechika et al. ........... | 386/81 |
| 6,101,195 A | * | 8/2000 | Lyons et al. ................. | 370/498 |
| 6,567,421 B2 | * | 5/2003 | Takeda et al. ............... | 370/468 |
| 6,577,646 B2 | * | 6/2003 | Takeda et al. ............... | 370/468 |
| 6,587,477 B1 | * | 7/2003 | Takeda et al. ............... | 370/468 |

FOREIGN PATENT DOCUMENTS

| | | |
|---|---|---|
| EP | 0 661 876 A2 | 7/1995 |
| EP | 0 825 783 A2 | 2/1998 |
| EP | 0 833 514 A2 | 4/1998 |
| EP | 0 862 295 A1 | 9/1998 |

OTHER PUBLICATIONS

Lauderdale J. et al. "Using the Minimum Reservation Rate for Transmission of Pre-Encoded MPEG VBR Video Using CBR Service", IEICE Transactions on Communications, Institute of Electronics Information and Comm. Eng. Tokyo, JP, vol. E79-B, No. 8, Aug. 1, 1996, pp. 1023-1029.

"Information Technology-Generic Coding of Moving Pictures and Associated Audio Information: Systems. Technologies De L'Information-Codage Des Images Animees et du Son Associe: Systems" International Standard ISO/IEC vol. 13818-1, pp. 1-73, Apr. 15, 1996.

ISO/IEC 13818-1:1996(E), ITU-T Rec. H.222.0 (1995 E); pp. 74-119.

* cited by examiner

*Primary Examiner*—Hanh Nguyen
(74) *Attorney, Agent, or Firm*—Frommer Lawrence & Haug LLP; William S. Frommer; Dennis M. Smid (57) ABSTRACT

A data recording and/or reproducing apparatus and method in which, during a recording operation, the maximum bit rate of a transport stream may be detected and along with the transport stream written into a storage medium. During a reproducing operation, the recorded transport stream and maximum bit rate information may be read from the storage medium and a band width or rate for transferring data over a digital interface may be set in accordance with the read maximum bit rate information. As a result, the digital interface band may be utilized for transferring data with a relatively high efficiency.

3 Claims, 11 Drawing Sheets

```
TSP_extra_header( ){
        reserved                    3 BIT
        time_stamp_counter         21 BIT
}
```

DATA RECORDING AND/OR REPRODUCING APPARATUS, METHOD, AND SYSTEM AND RECORDING MEDIUM

BACKGROUND OF THE INVENTION

The present invention relates to a data recording and/or reproducing technique and, more particularly, to such technique in which a multiplexed stream such as a transport stream and information pertaining to a maximum rate thereof may be stored onto a recording medium during a recording operation and the stored multiplexed stream is outputted by way of a digital interface during a reproducing operation in accordance with the maximum rate information.

In digital television broadcasting such as digital video broadcasting (DVB), digital television (DTV) or the like, a transport stream such as in MPEG2 systems (ISO/IEC 13818-1) may be utilized for multiplexed data. In such transport stream, video and audio streams may be multiplexed in units of transport packets each having 188 bytes. Additionally, transport packets of a plurality of independent television programs can be multiplexed in one transport stream.

Figure 5:
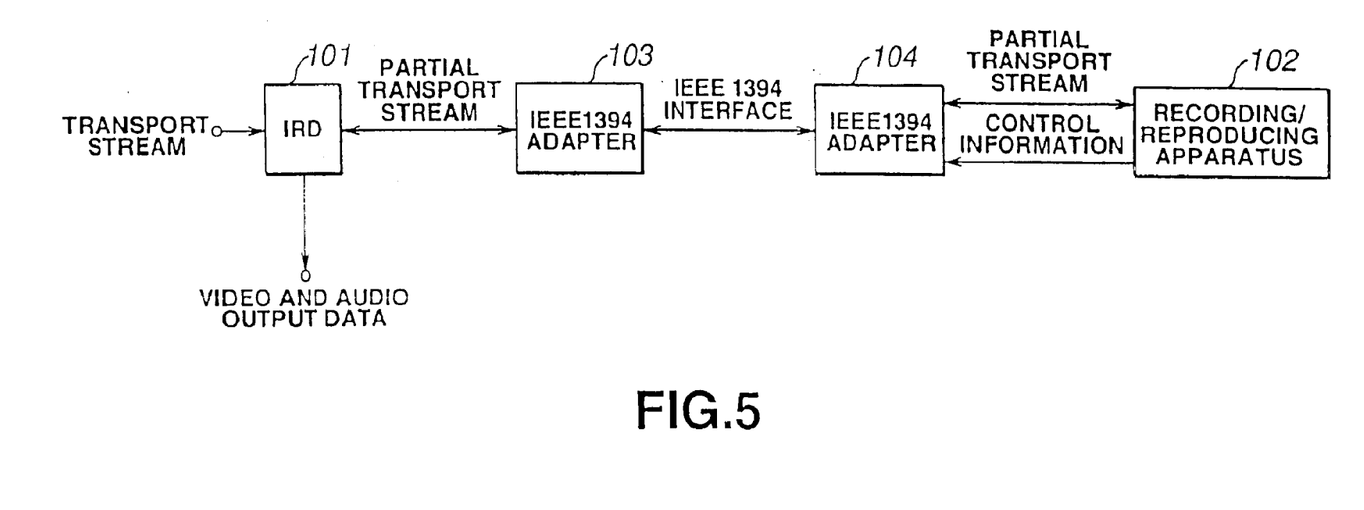
FIG. 5 is a diagram of a system having a transport stream recording and reproducing apparatus for receiving a digital television broadcast program.

FIG. 5 illustrates a reception system for receiving a digital television broadcast program. Such digital television broadcast reception system may include an integrated receiver/decoder (IRD) 101 which may receive a transport stream, and a transport stream recording and reproducing apparatus 102 which may write and/or read transport packets of a television program into and/or from a storage medium. The IRD 101 and transport stream recording and reproducing apparatus 102 may be connected to a digital interface to transmit and receive the transport packets. For example, the IRD 101 and transport stream recording and reproducing apparatus 102 may have IEEE 1394 adapters 103 and 104 respectively connected thereto so as to enable the transmission and reception of the transport packets therebetween by way of an IEEE 1394 interface.

A transport stream received by the IRD 101 may have multiplexed transport packets of a plurality of television programs. The IRD 101 may extract from the received transport stream the transport packets of one or more television programs selected by a user. The stream comprising the transport packets extracted by the IRD 101 is referred to as a "partial transport stream". The partial transport stream may be isochronously transferred from the IRD 101 by way of the IEEE 1394 interface to the transport stream recording and reproducing apparatus 102 which may write the same into a storage medium. If the transport stream transmitted by digital television broadcasting has been statistically multiplexed, the partial transport stream may be transferred at a variable bit rate.

Figure 6:
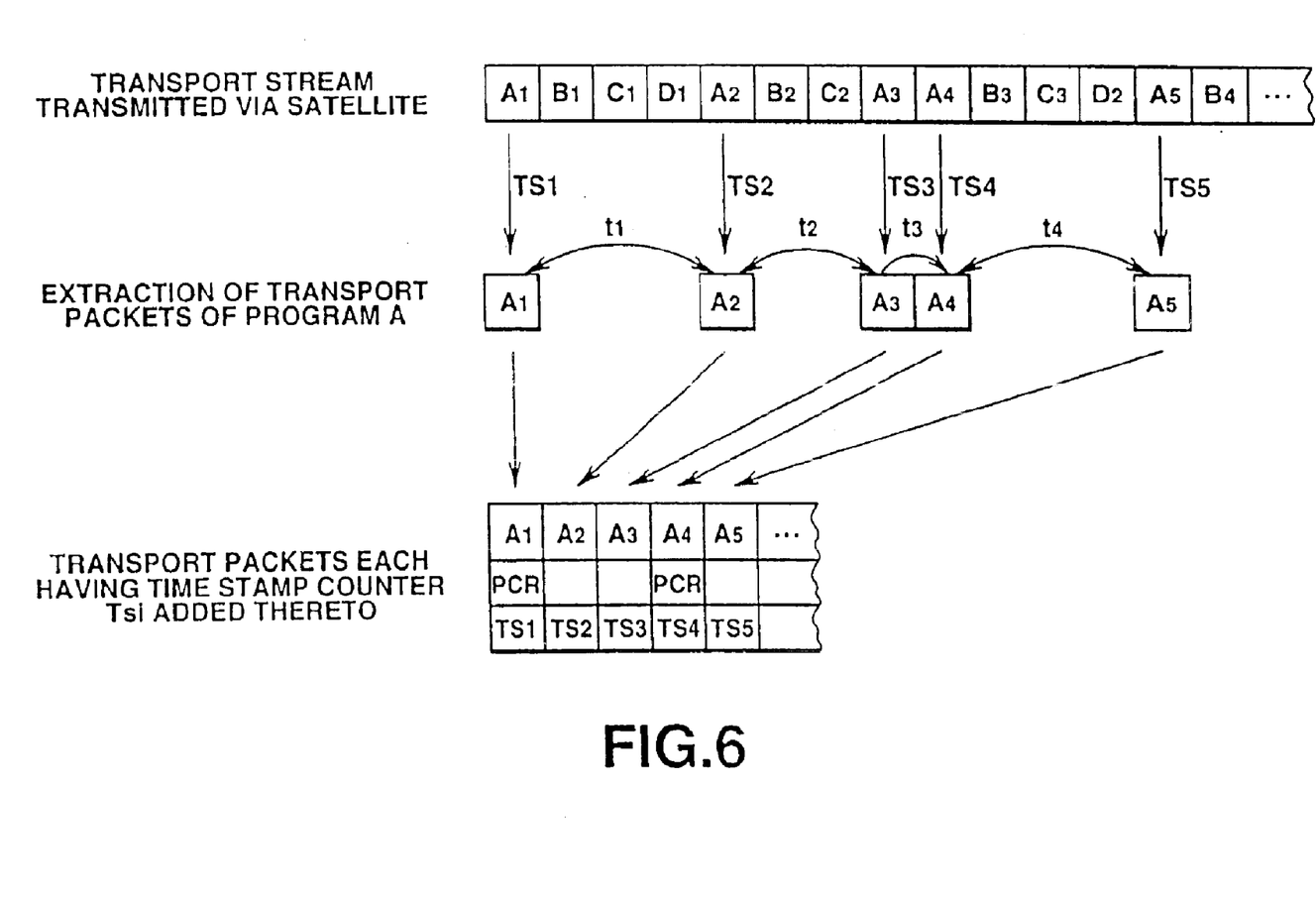
FIG. 6 is a diagram to which reference will be made in explaining the transport stream recording and reproducing apparatus of FIG. 5.

Transport packets of one or more television programs extracted from a transport stream having a plurality of multiplexed television programs may appear at irregular intervals. As an example, consider the situation in which transport packets of a plurality of channels (such as four channels for programs A to D) have been multiplexed in a transport stream and transmitted by way of a satellite as shown in FIG. 6. In such situation, transport packets (Ai) of the program A extracted from the transport stream may appear at irregular intervals. That is, as representatively shown in FIG. 6, an interval t1 between transport packets A1 and A2, an interval t2 between transport packets A2 and A3, an interval t3 between transport packets A3 and A4, and an interval t4 between transport packets A4 and A5, are not identical to each other.

If the transport stream recording and reproducing apparatus 102 writes the extracted transport packets Ai into a storage medium, the storage capacity of the storage medium may not be effectively utilized if the intervals between the transport packets Ai are relatively long and/or unequal. To more effectively utilize the storage medium capacity, the intervals of the transport packets Ai may be reduced and such packets may be written into the storage medium. However, if the stored transport packets Ai with reduced intervals are read, the read output packets may not have the same timing arrangement as when they had been transmitted and, as a result, they may not be supplied to a transport-system target decoder (T-STD) defined in MPEG2 in the same timing arrangement as when they had been encoded. As a result, a buffer of the T-STD may experience an overflow or underflow condition and may eventually fail.

To enable transport packets Ai to be output in the same timing arrangement as when they had been transmitted, the transport stream recording and reproducing apparatus 102 may record a time stamp counter TSi synchronous with a program clock reference (PCR) in each of the transport packets Ai, as shown in FIG. 6.

A further description of the transport stream recording and reproducing apparatus 102 will now be provided.

A consumer-use digital cassette recorder (VCR) which uses a digital video cassette (DVC) as a storage medium may be utilized as the transport stream recording and reproducing apparatus 102.

Figure 7:
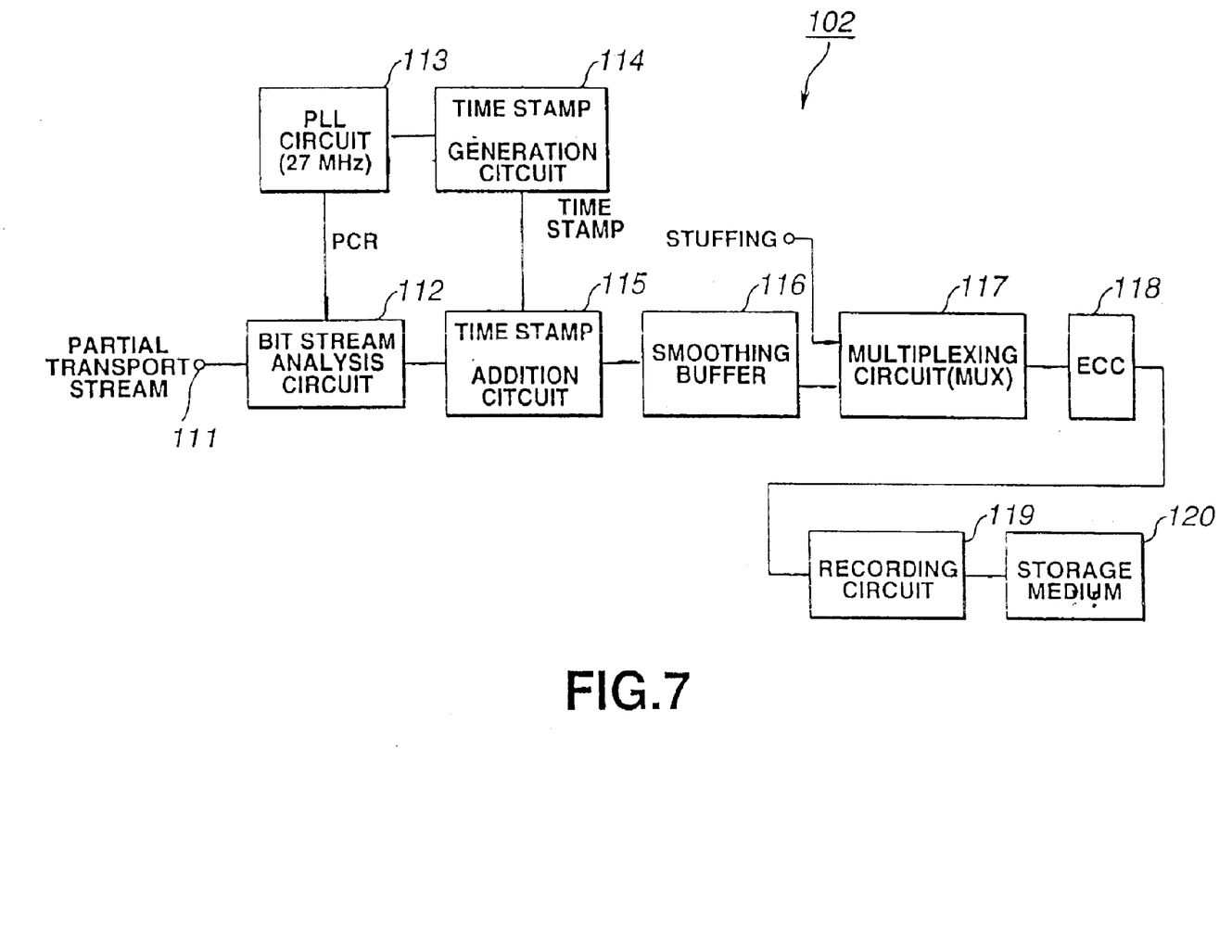
FIG. 7 is a diagram of a recording portion of the transport stream recording and reproducing apparatus of FIG. 5.

The transport stream recording and reproducing apparatus 102 may have a recording system or portion as shown in FIG. 7. As shown therein, the recording portion of the transport stream recording and reproducing apparatus 102 may include a terminal 111 to which a partial transport stream may be supplied from the IRD 101 by way of the IEEE 1394 interface, a bit stream analysis circuit 112 for analyzing the partial transport stream supplied from the terminal 111, a phase-locked loop (PLL) circuit 113 for generating a 27 MHz clock signal synchronous with the PCR added to the partial transport stream, a time stamp generation circuit 114 for generating a time stamp synchronous with the PCR in accordance with the clock signal from the PLL 113, a time stamp addition circuit 115 for adding the time stamp from the time stamp generation circuit 114 to each packet in the partial transport stream supplied by way of the bit stream analysis circuit 112. Additionally, the transport stream recording and reproducing apparatus 102 may include a smoothing buffer 116 for temporarily storing a data stream to which the time stamp has been added by the time stamp generation circuit 115, a multiplexing circuit 117 for multiplexing the data stream stored in the smoothing buffer 116 and a stuffing byte(s) to produce a data stream having a constant bit rate, an error correction code (ECC) circuit 118 for adding an error correction code to the multiplexed data, stream, and a recording circuit 119 for writing the data stream output from the ECC 118 into a storage medium 120.

The recording portion of the transport stream recording and reproducing apparatus 102 and/or operation thereof will now be further described.

The partial transport stream received at the terminal 111 is supplied to the bit stream analysis circuit 112 which may read a standard reference time PCR if included in the transport packets of the partial transport stream. The bit stream analysis circuit 112 may supply the transport packets to the time stamp addition circuit 115 and the PCR to the PLL circuit 113. The PLL circuit 113 may generate a 27

MHz clock signal in synchronous with the received PCR and may provide the same to the time stamp generation circuit 114 which, in turn, may count clocks or pulses of the received clock signal and may generate a time stamp corresponding to such count. The time stamp may be supplied to the time stamp addition circuit 115.

Figure 8:
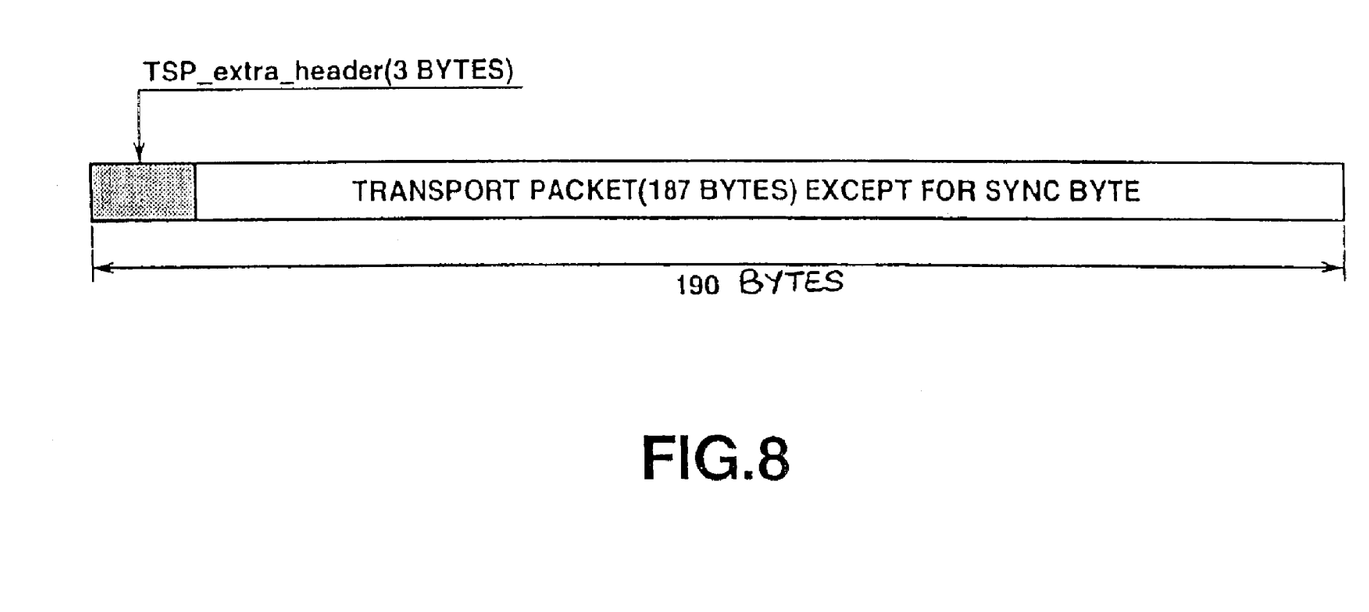
FIG. 8 is a diagram of a data format which may be utilized by the transport stream recording and reproducing apparatus of FIG. 5 for writing data into a storage medium.
Figure 9:
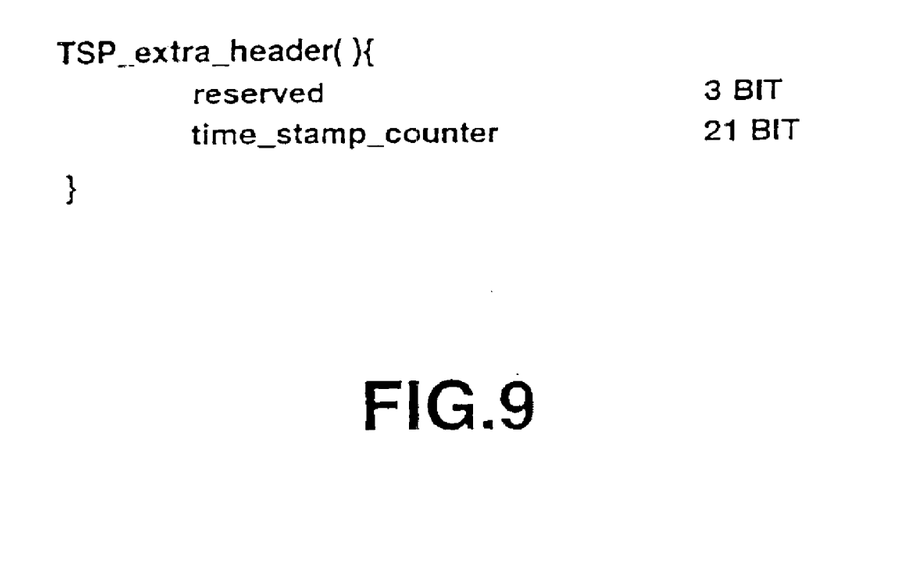
FIG. 9 is a diagram to which reference will be made in explaining a TSP which may be recorded by the transport stream recording and reproducing apparatus of FIG. 5 into a storage medium.

The time stamp addition circuit 115 may add the received time stamp to each of the packets in the partial transport stream supplied from the bit stream analysis circuit 112. More specifically, the time stamp addition circuit 115 may add a so-called TSP_extra_header which may include 3 bytes of data to 187 bytes of the 188 byte-long transport packet(s) in which the leading 1 sync byte is deleted so as to generate a block having 190 bytes, as shown in FIG. 8. The TSP_extra_header may have a 3 bit reserve area and a 21 bit time stamp counter arranged as shown in FIG. 9. The time stamp counter may indicate the time at which a first bit of a first byte of the transport packet may arrive at the input of the smoothing buffer as defined in ISO/IEC 13818-1. It should be noted that the format shown in FIG. 8 is for a transport stream recording system which may be applied to a consumer-use digital VCR (video cassette recorder) which may use a cassette tape and that a different format may be utilized for a transport stream recording system if applied differently and/or with a different recording medium.

The data output from the time stamp addition circuit 115 may be stored in the smoothing buffer 116. The smoothing buffer 116 may output the stored data at a predetermined bit rate to the multiplexing circuit 117 and the smoothing buffer will output no data to the multiplexing circuit if there is none stored therein. In this latter situation, to maintain a constant bit rate as defined by the recording format of the digital VCR, dummy data may be inserted or stuffed ("byte stuffing") into the multiplexing circuit 117 so that the output bit rate is equal to a predetermined recording rate. That is, if the bit rate of a partial transport stream is lower than a predetermined fixed recording rate, dummy data may be inserted so that data may be recorded at the predetermined rate. For example, when operating in a standard television mode, the digital VCR may record in any one of three different modes: a standard (SD) mode (25 Mbps), ½-SD mode (12.5 Mbps), and a ¼-SD mode (6.25 Mbps) depending upon the recording bit rate. In the DVB (digital video broadcasting) system, since programs may be transmitted at a rate lower than 9 Mbps, the transport stream recording and reproducing apparatus 102 may use the ½-SD mode whereupon the multiplexing circuit 117 may provide data at 12.5 Mbps.

The stream output from the multiplexing circuit 117 may have an error correction code added thereto by the ECC circuit 118. The output of the ECC circuit 118 may be supplied to the recording circuit 119 so as to be written into the storage medium 120.

Figure 10:
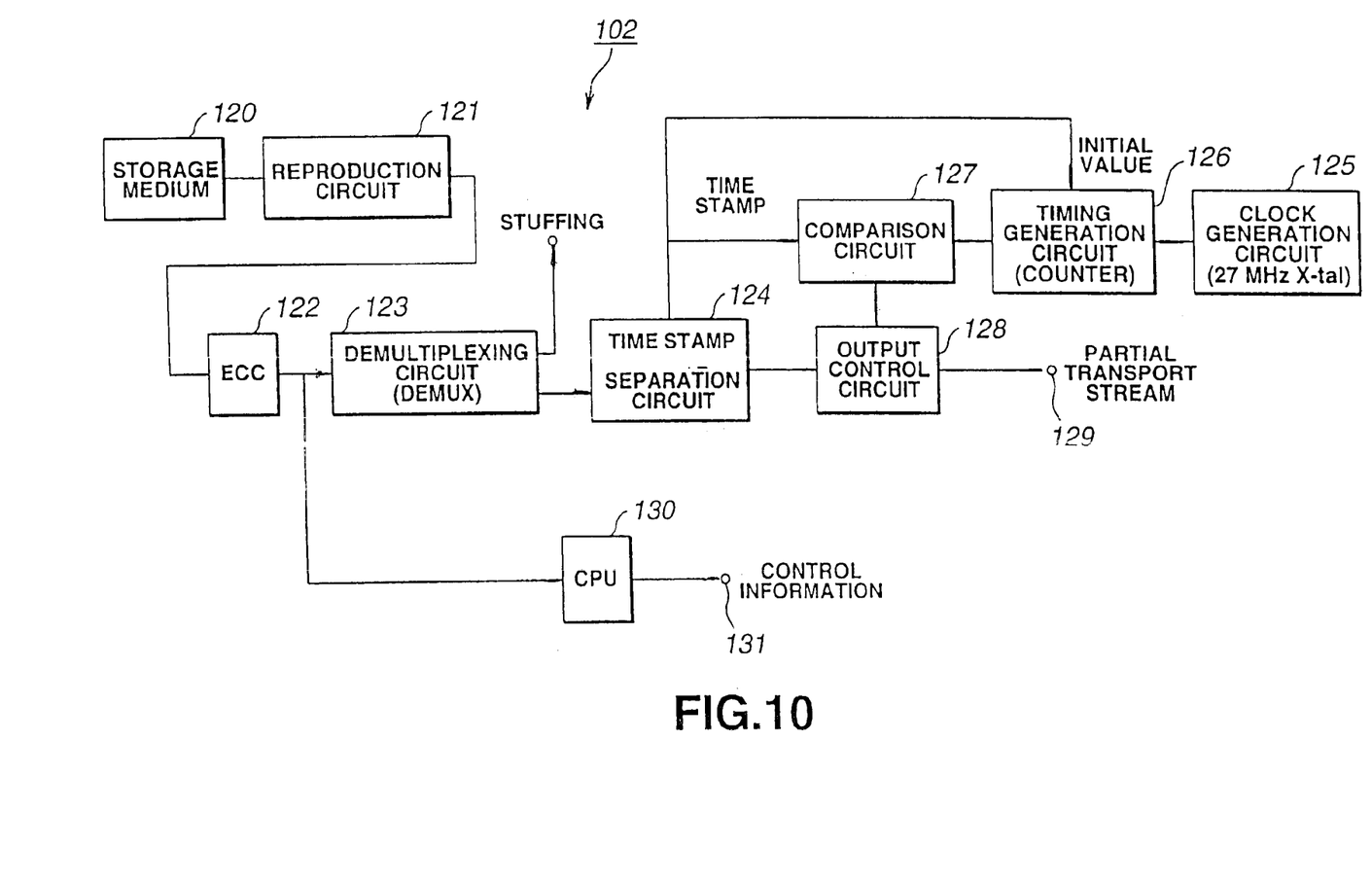
FIG. 10 is a diagram of a reproduction portion of the transport stream recording and reproducing apparatus of FIG. 5.

The transport stream recording and reproducing apparatus 102 may include a reproduction system or portion as shown in FIG. 10. As shown therein, the reproduction portion of the transport stream recording and reproducing apparatus 102 may include a reproduction circuit 121 for reading a data stream recorded in the storage medium 120, an ECC circuit 122 for performing error correction on the data stream outputted by the reproduction circuit 121, a demultiplexing circuit 123 for separating the stuffing byte or bytes from the error-corrected data stream so as to provide a data stream having only the partial transport stream, and a time stamp separation circuit 124 for separating the added time stamp from each packet of the partial transport stream outputted by the demultiplexing circuit 123. The transport stream recording and reproducing apparatus 102 may further include a clock generation circuit 125 for generating a clock signal having a predetermined frequency such as 27 MHz in a free-running manner, a timing generation circuit 126 which may have a counter for counting clocks or pulses of the clock signal generated by the clock generation circuit 125 from the initial or first time stamp separated by the time stamp separation circuit 124, a comparison circuit 127 for comparing a time stamp separated by the time stamp separation circuit 124 and the count determined by the timing generation circuit 126, and an output control circuit 128 for outputting by way of a terminal 129 each packet in the partial transport stream from which the time stamp has been separated by the time stamp separation circuit 124 at a time(s) based on the comparison result obtained from the comparison circuit 127. In addition, the transport stream recording and reproducing apparatus 102 may also include a central processing unit (CPU) 130 for detecting or determining a recording mode and for supplying such recording mode information to the IEEE 1394 interface by way of a control terminal 131.

A reproduction operation of a partial transport stream will now be described.

To reproduce a partial transport stream written in the storage medium 120, the reproduction circuit 121 may initially read from the storage medium 120 information indicative of the mode in which the partial transport stream had been recorded. Such recording mode information may be error corrected by the ECC circuit 122 and then supplied to the CPU 130. In response thereto, the CPU 130 may generate a control signal indicative of the recording mode and may supply the same to the IEEE 1394 adapter 104 (FIG. 5). In response to such control signal, the IEEE 1394 adapter 104 may reserve a data transfer rate for the digital interface in accordance with the recording mode. For example, when the recording mode is the ½-SD mode, the IEEE 1394 adapter 104 may reserve a data transfer rate of 12.5 Mbps.

The transport stream recorded on the storage medium 120 may be read by the reproduction circuit 121, subjected to error correction by the ECC circuit 122, and then have the stuffing byte(s) removed by the demultiplexing circuit 123. The transport stream with the stuffing byte(s) removed may be supplied to the time stamp separation circuit 124 whereupon it will be separated into a number of transport packets and time stamps. The transport packet(s) may be supplied to the output control circuit 128 while the time stamp(s) may be supplied to the comparison circuit 127 and timing generation circuit 126.

The counter of the timing generation circuit 126 may count clocks or pulses of the 27 MHz clock signal generated by the clock generation circuit 125 from an initial value determined by the time stamp. The obtained count value may be supplied to the comparison circuit 127. When the value of a time stamp supplied from the time stamp separation circuit 124 coincides with the count value supplied from the timing generation circuit 126, the comparison circuit 127 may control the output control circuit 128 to allow the transport packet(s) supplied from the time stamp separation circuit 124 to be supplied to terminal 129. For example, if the storage medium 120 has the partial transport stream shown in FIG. 6 stored therein, the comparison circuit 127 may control the output control circuit 128 to provide the transport packet A1 when the count output from the timing generation circuit 126 becomes TS1, to provide the transport packet A2 when the count output becomes TS2, to provide the transport packet A3 when the count output becomes TS3, to provide the transport packet A4 when the count output becomes TS4, to provide the transport packet A5 when the count output becomes TS5, and so forth. As such, the transport packets Ai may be provided in the same time sequence or timing arrangement as that in which they had been encoded. As a result, the above-described failures of the T-STD may be prevented.

With reference back to FIG. 5, the partial transport stream provided by the transport stream recording and reproducing apparatus 102 may be isochronously transferred from the IEEE 1394 adapter 104 to the IEEE 1394 adapter 103. The IEEE 1394 adapter 103 may supply the received transport stream to the IRD 101 which, in turn, may decode it so as to reproduce video and audio signals.

In the transport stream recording and reproducing apparatus 102, if the bit rate of a transport stream supplied thereto for recording is lower than the predetermined fixed recording rate, dummy data may be inserted so as to enable data recording at the predetermined rate. Also, with regard to the outputting of a partial transport stream to the digital interface by the transport stream recording and reproducing apparatus 102, the predetermined recording rate may be reserved for the rate of data transfer by way of the digital interface. Thus, in the transport stream recording and reproducing apparatus 102, even if the maximum bit rate for the partial transport stream obtained after the removal of the dummy data from the recorded data is lower than the predetermined recording rate (which may, for example, be 12.5 Mbps in the ½-SD mode), the predetermined recording rate may be reserved for the data transfer rate for outputting the transport stream by way of the digital interface. As a result, the digital interface band may not be effectively utilized.

OBJECTS AND SUMMARY OF THE INVENTION

An object of the present invention is to provide a technique which overcomes the above-mentioned disadvantages such that a data stream may be outputted by way of a digital interface wherein an efficient use is made of the digital interface.

Another object of the present invention is to provide a technique wherein a maximum rate of the data stream is obtained and the data stream is outputted over the digital interface in accordance with the maximum rate.

In accordance with an aspect of the present invention, an apparatus for supplying a data stream is provided which comprises a device for obtaining a maximum bit rate of the data stream, a device for setting a transmission band width in accordance with the maximum bit rate of the data stream, and a device for outputting the data stream within the set band width.

In accordance with another aspect of the present invention, an apparatus for reproducing data from a recording medium is provided. Such apparatus comprises a device for reproducing a data stream from the recording medium, a device for obtaining maximum bit rate information of the data stream, a device for setting a transmission band width in accordance with information indicative of the maximum bit rate of the data stream, and a device for outputting the data stream within the set band width.

In accordance with a still other aspect of the present invention, an apparatus for recording data on a recording medium is provided. Such apparatus comprises a receiving device for receiving a data stream, a device for obtaining a maximum bit rate of the data stream, and a recording device for recording the data stream and information indicative of the maximum bit rate on the recording medium.

In accordance with another aspect of the present invention, a system for recording and reproducing data onto and from a recording medium is provided. Such system comprises a receiving device for receiving a data stream, a device for obtaining a maximum bit rate of the data stream, a recording device for recording the data stream and information indicative of the maximum bit rate on the recording medium, a device for reproducing the data stream and the information indicative of the maximum bit rate from the recording medium, a device for setting a transmission band width in accordance with the reproduced information indicative of the maximum bit rate, and an output device for outputting the data stream within the set band width.

In accordance with another aspect of the present invention, a recording medium is provided which comprises a recordable data region for storing a data stream and information indicative of a maximum bit rate of the data stream, wherein the maximum bit rate is obtained during a recording operation.

Other objects, features and advantages according to the present invention will become apparent from the following detailed description of illustrated embodiments when read in conjunction with the accompanying drawings in which corresponding components are identified by the same reference numerals.

DETAILED DESCRIPTION OF PREFERRED EMBODIMENTS

An embodiment of a transport stream recording and reproducing apparatus according to the present invention will now be described with reference to the accompanying drawings.

The present transport stream recording and reproducing apparatus may be utilized for writing into and/or reading from a recording medium a multiplexed stream transmitted by digital television broadcasting such as DVB, DTV or the like. As an example, the present transport stream recording and reproducing apparatus may be coupled to an IRD by way of an IEEE 1394 digital interface in a manner similar to that of FIG. 5. In other words, the present transport stream recording and reproducing apparatus may replace the transport stream recording apparatus 102 shown in FIG. 5. As such, the present transport stream recording and reproducing apparatus may write into the recording medium a partial transport stream supplied from the IRD by way of the IEEE 1394 digital interface and/or may read a partial transport stream recorded in the recording medium and supply the same by way of the IEEE 1394 digital interface to the IRD which may transmit the partial transport stream to the outside.

Figure 1A:
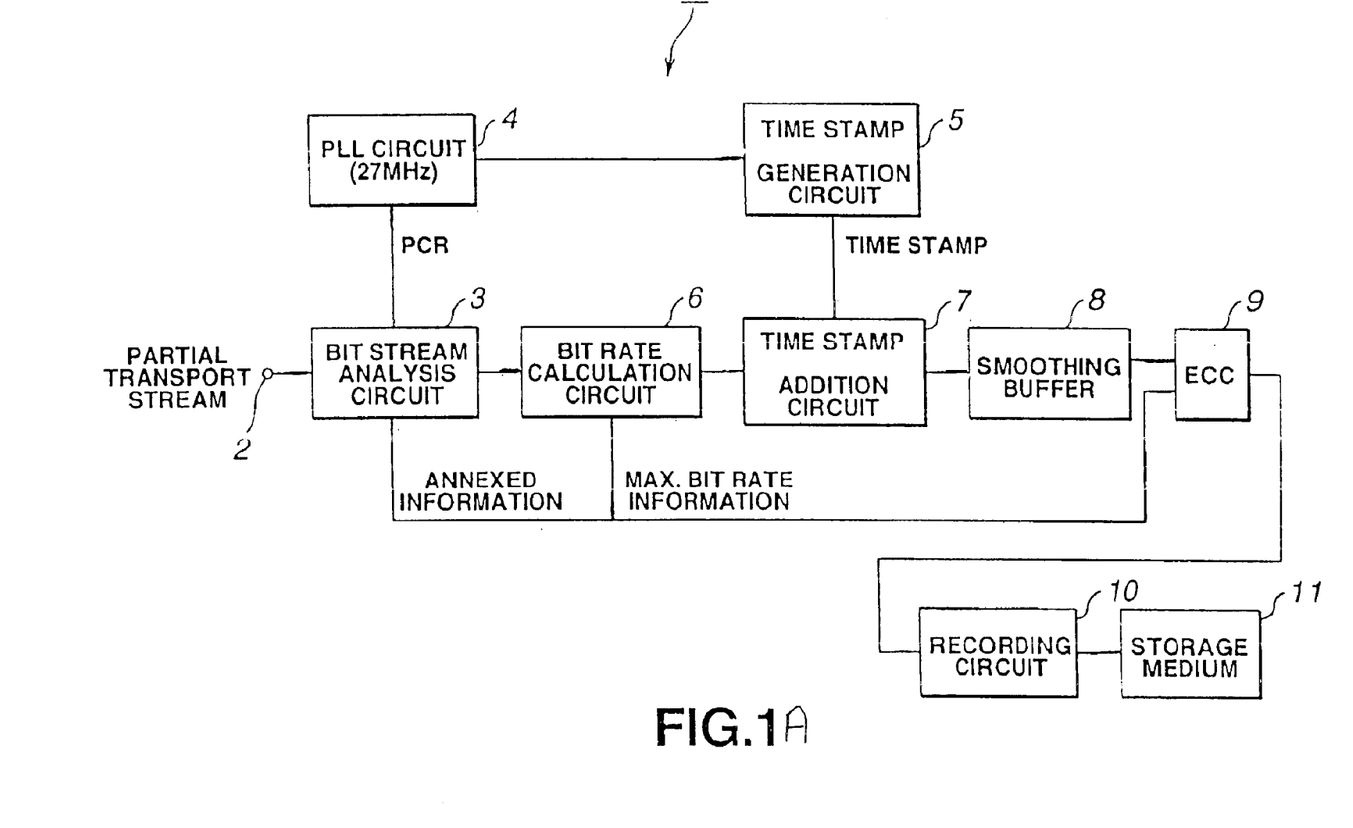
FIG. 1A is a diagram of a recording portion of a transport stream recording and reproducing apparatus according to an embodiment of the present invention.

FIG. 1A illustrates a recording system of a transport stream recording and reproducing apparatus 1. The transport stream recording and reproducing apparatus 1 may be utilized as a digital VCR (video cassette recorder) for consumer use which is adapted to use a digital video cassette (DVC) as a storage medium.

The transport stream recording and reproducing apparatus 1 may include a bit stream analysis circuit 3, a phase-locked loop (PLL) circuit 4, a time stamp generation circuit 5, a bit rate calculation circuit 6, a time stamp addition circuit 7, a smoothing buffer 8, an error correction code (ECC) circuit 9, and a recording circuit 10 which may be arranged as shown in FIG. 1A.

A partial transport stream, which may conform to an MPEG standard or the like, may be supplied from the IRD by way of the IEEE 1394 interface through a terminal 2 to the bit stream analysis circuit 3 which may analyze the received partial transport stream. The PCR (program clock reference) added to the partial transport stream may be obtained and supplied from the bit stream analysis circuit 3 to the PLL circuit 4 which may generate a clock signal having a predetermined frequency (such as 27 MHz) synchronous with the received PCR. The clock signal may be supplied to the time stamp generation circuit 5 which may generate a time stamp synchronous with the PCR in accordance with the received clock signal. An output of the bit stream analysis circuit 3 may be supplied to the bit rate calculation circuit 6 whereupon the bit rate thereof may be calculated. The time stamp from the time stamp generation circuit 5 and an output from the bit rate calculation circuit 6 may be supplied to the time stamp addition circuit 7 which may add the time stamp to each packet in the partial transport stream. An output from the time stamp addition circuit 7 may be supplied to the smoothing buffer 8 which may temporarily store the stream having the time stamp added thereto. A partial transport stream outputted from the smoothing buffer 8 may be supplied to the ECC circuit 9 whereupon an error correction code may be added to the partial transport stream. The partial transport stream with the error correction code may be supplied to the recording circuit 10 which may write the same into a storage medium 11.

A further description of the recording portion of the transport stream recording and reproducing apparatus 1 and/or operation thereof will now be provided.

The partial transport stream received at the terminal 2 is supplied to the bit stream analysis circuit 3 which may detect therefrom the supplied partial transport stream receiving-side leak buffer size information, output bit rate information from the receiving-side leak buffer and broadcasting provider information (hereinafter referred to as "annexed information") and supply the same to the recording circuit 10 by way of the ECC circuit 9. The bit stream analysis circuit 3 may read or detect a PCR (which is a standard reference time) if included in the transport packets of the partial transport stream. The bit stream analysis circuit 3 may supply the PCR to the PLL circuit 4 and may supply transport packets to the bit rate calculation circuit 6.

The bit rate calculation circuit 6 may calculate a bit rate of the transport stream between two transport packets having a PCR associated therewith and may calculate or determine the maximum one thereof. Such calculation or determination will now be further described with reference to FIGS. 1B and 1C.

Figure 1B:
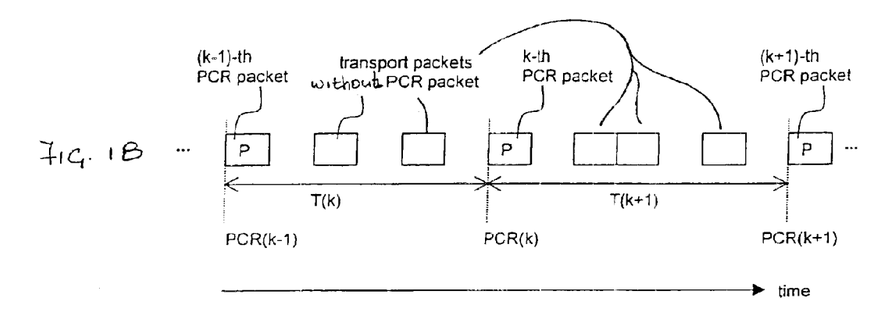
FIG. 1B is a diagram to which reference will be made in explaining the operation of a bit rate calculation circuit of the recording portion of the transport stream recording and reproducing apparatus of FIG. 1A.

FIG. 1B illustrates transport packets (P) which have a PCR (PCR packet) associated therewith and transport packets which do not have a PCR associated therewith. In the situation shown in FIG. 1B, three transport packets are included between the (k−1)th PCR packet and the kth PCR packet and four transport packets are included between the kth PCR packet and the (k+1)th PCR packet.

The bit rate between PCR packets (such as the (k−1)th PCR packet and the (k)th PCR packet), or program_rate(k) which may be expressed in terms of bytes/second, may be calculated from the following equation:

$$\text{program\_rate}(k) = \text{size\_transport\_packet} * \text{num\_packets}(k)/T(k) \quad (1)$$

in which k begins with 1, size_transport_packet is 188 bytes, nun_packets(k) is the number of transport packets between the (k−1)th and kth PCR packets, T(k) is equal to ((PCR(k)−(PCR(k−1))/system_clock_frequency in which system_clock_frequency is equal to 27,000 Hz, PCR(K) is a PCR value of the kth PCR packet, and PCR(k−1), is a PCR value of the (k−1)th PCR packet. In the case involving the (k−1)th PCR packet and the (k)th PCR packet, num_packets (k) is equal to 3.

The maximum bit rate of the transport stream, or max_program_rate, may be calculated from the following equation:

$$\text{max\_program\_rate} = \text{MAX}(\text{program\_rate}(1), \text{program\_rate}(2), \ldots \text{program\_rate}(k), \ldots, \text{program\_rate}(N)) \quad (2)$$

Figure 1C:
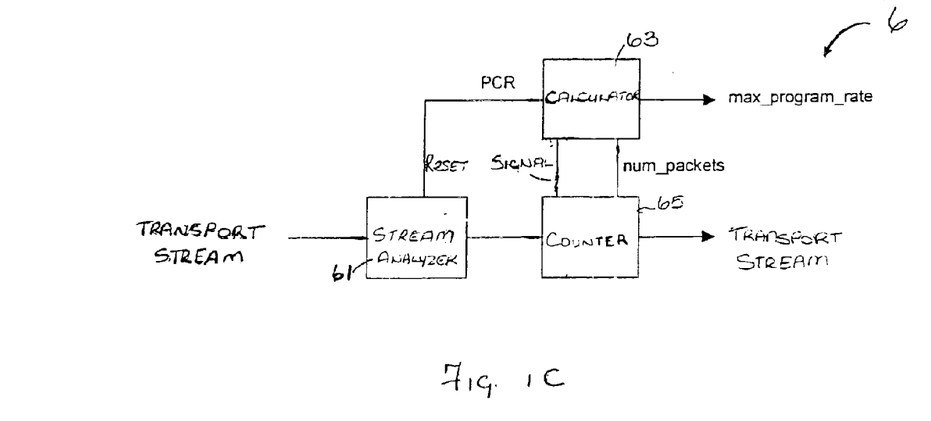
FIG. 1C is a diagram of the bit rate calculation circuit of the recording portion of the transport stream recording and reproducing apparatus of FIG. 1A.

As shown in FIG. 1C, the bit rate calculation circuit 6 may include a stream analyzer 61, a calculator 63, and a counter 65. The stream analyzer 61 may receive a transport stream from the bit stream analysis circuit 3 (FIG. 1A) and may detect therefrom PCR packets and supply the same to the calculator 63. Upon receiving a PCR, the calculator 63 may form a reset signal and may supply the same to the counter 65.

The stream analyzer 61 may also supply transport packets to the counter 65 which performs a counting operation thereon. The counter 65 may output num_packets to the calculator 63 which indicates the counting value at the time the reset signal is received. The counting value in the counter 65 may thereafter be reset to zero. The counter 65 may output a transport stream to the time stamp addition circuit 7 (FIG. 1A).

The calculator 63 may calculate the bit rate between two PCR packets in accordance with the above equation 1. After the transport packets have been received, the calculator 63 may calculate the maximum bit rate or max_program_rate in accordance with the above equation 2 and may output the same to the ECC circuit 9 (FIG. 1A).

Therefore, and with reference back to FIG. 1A, the bit rate calculation circuit 6 may calculate the maximum bit rate of the partial transport stream to be recorded and may supply the transport packets for which the bit rate has been calculated to the time stamp addition circuit 7. Further, the bit rate calculation circuit 6 may supply the maximum bit rate information (or max_program_rate) to the recording circuit 10 by way of the ECC circuit 9.

The PLL circuit 4 may receive the PCR and may generate a 27 MHz clock signal synchronously with the received PCR and provide the same to the time stamp generation circuit 5 which, in turn, may count the clocks or pulses of the clock signal and generate a time stamp (such as time_stamp_counter) corresponding to such count. The time stamp may be supplied from the time stamp generation circuit 5 to the time stamp addition circuit 7.

The time stamp addition circuit 7 may add the received time stamp to each packet of the partial transport stream supplied from the bit stream analysis circuit 6. More specifically, the time stamp addition circuit 7 may add 3 bytes of TSP_extra_header to 187 bytes of the 188 byte-long transport packet in which the leading 1 sync byte is deleted to generate a block having 190 bytes, as shown in FIG. 8. The TSP_extra_header may have a 3 bit reserve area and a 21 bit_time_stamp counter arranged as shown in FIG. 9. The time_stamp_counter may indicate the time at which a first bit of a first byte of the transport packet may arrive at the input of the smoothing buffer as defined in ISO/IEC 13818-1.

The data output from the time stamp addition circuit 7 may be supplied to the smoothing buffer 8 and stored therein. The smoothing buffer 8 may output the stored data at a predetermined bit rate and will output no data if there is none stored therein. The output stream from the smoothing buffer 8 may be supplied to the ECC circuit 9 wherein an error correction code may be added thereto. An output from the ECC circuit 9 may be supplied to the recording circuit 10 whereupon it will be written into the storage medium 11.

Therefore, the transport stream recording and reproducing apparatus 1 may write data into the storage medium 11 at a constant bit rate defined by the digital VCR format without inserting dummy data That is, if the smoothing buffer 8 has data stored therein, such data may be written into the storage medium 11 at the constant bit rate; and if data is not stored in the smoothing buffer 8, the writing of data into the storage medium may be stopped.

In this transport stream recording and reproducing apparatus 1, the annexed information detected by the bit stream analysis circuit 3 and the maximum bit rate information determined by the bit rate calculation circuit 6 may have an error correction code added thereto in the ECC circuit 9 and may thereafter be written into the storage medium 11 by the recording circuit 10. The annexed information and maximum bit rate information may be filed or recorded separately from the program data of the partial transport stream. For example, such information may be recorded in a table of contents (TOC) portion or the like or, alternatively, recorded as head information of the program.

An example of the recording of the annexed information and maximum bit rate information will now be described with reference to FIG. 2.

Figure 2:
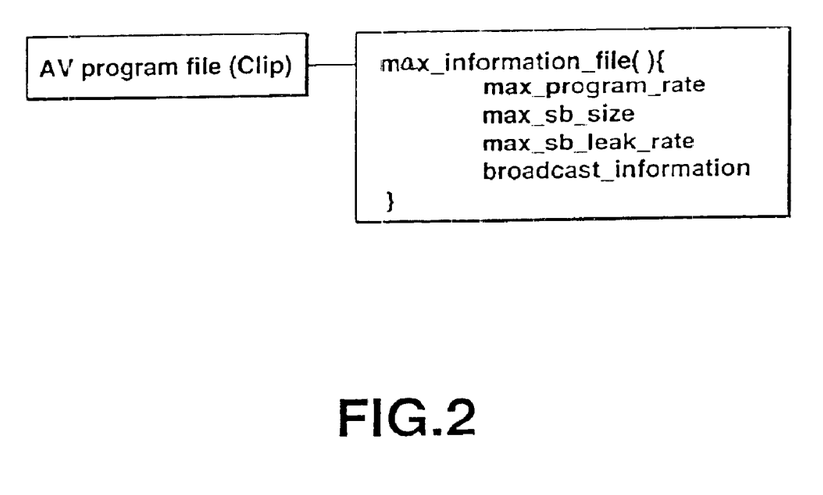
FIG. 2 illustrates a file format in which annexed information and maximum bit rate information may be written by the present transport stream recording and reproducing apparatus into a storage medium.

The transport stream recording and reproducing apparatus 1 may be adapted to store a file of annexed information and maximum bit rate information (max_information_file) separately from a file of a partial transport stream (AV program file (clip)) as shown in FIG. 2. The max_information_file may store maximum bit rate information (max_program_rate), receiving-side leak buffer size information (max_sb_size), receiving-side leak buffer output bit rate information (max_sb_leak_rate), and broadcasting provider information (broadcast_information).

The max_program_rate may indicate a maximum value in a chunk of maximum_bitrate defined by the maximum_bitrate_descriptor in ISO/IEC 13818-1. If no maximum_bitrate_descriptor exists in the clip or program file of the recorded transport stream, the max_program_rate may be defined as the maximum value in the clip of the program_rate which may be expressed by the following equation:

$$\text{program\_rate} = ((j-i) * \text{system\_clock\_frequency})/(\text{PCR}(j) - \text{PCR}(i)\beta)$$

wherein i is an index number for a byte including the last bit of a base field of the latest program_clock_reference applied to a program to be decoded, j is an index number of a byte including the last bit of the base field of a program_clock_reference applied to the program to be decoded and immediately following the program, the relation between i and j being i<j and PCR is a time coded with a base field and extension field in units of a system clock.

The max_sb_size may indicate the maximum value in a clip of sb_size defined by the smoothing_buffer_descriptor in ISO/IEC 13818-1. If a smoothing_buffer descriptor does not exist in the clip, all bit fields in the max_sb_size may be set to "1b". In such situation, the max_sb_size may not be significant.

The max_sb_leak_rate may indicate the maximum value in a clip of sb_leak_rate defined by the smoothing_buffer_descriptor in ISO/IEC 13818-1. If a smoothing_buffer_descriptor does not exist in the clip, all bit fields in the max_sb_leak_rate may be set to "1b". In such situation, the max_sb_leak_rate may not be significant.

The broadcast_information may indicate broadcasting provider information, and may be used to identify a destination IRD to which a transport stream recorded in the storage medium 11 is to be transmitted.

A reproduction system or portion of the transport stream recording and reproducing apparatus 1 will now be described with reference to FIG. 3.

Figure 3:
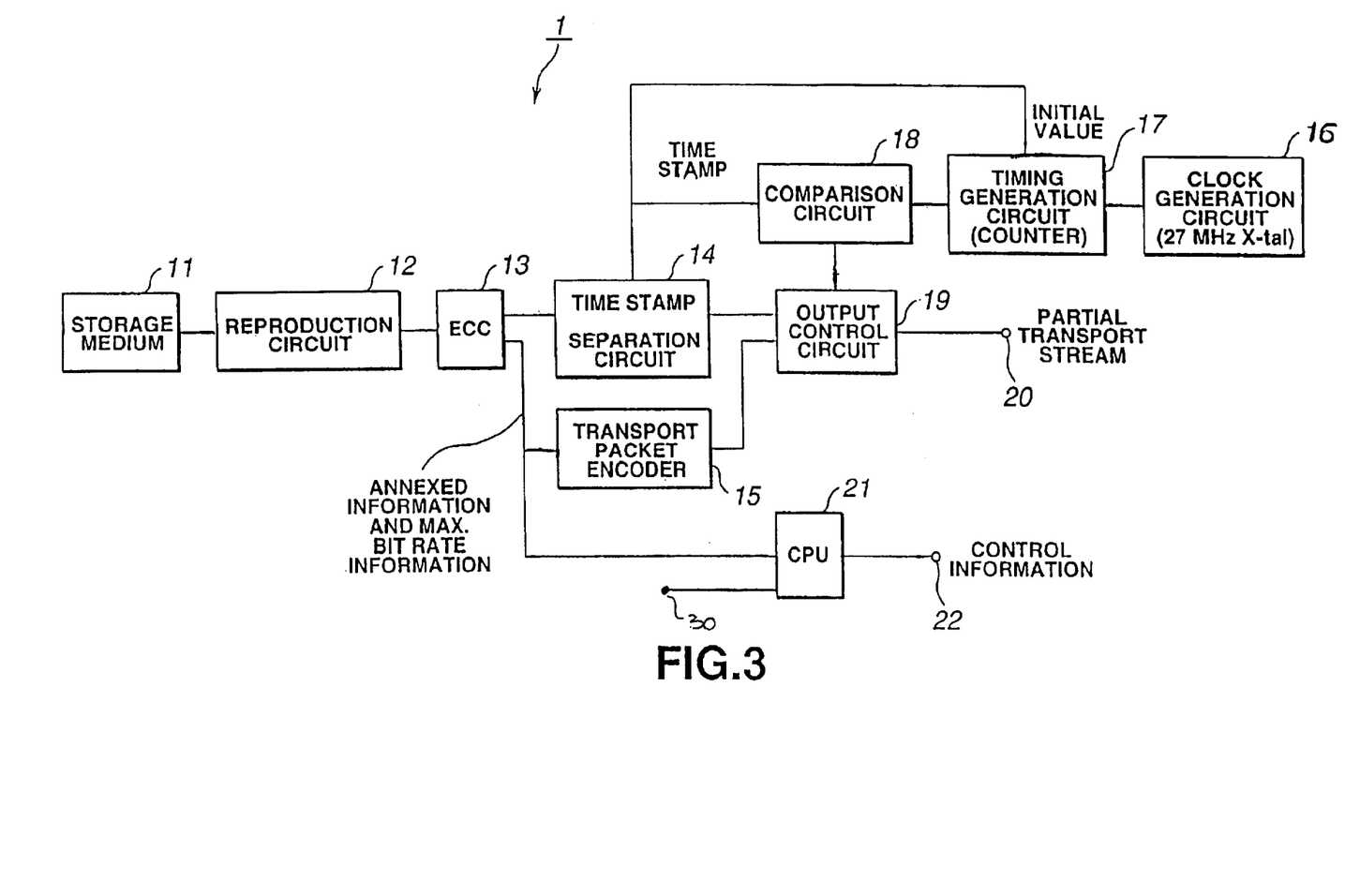
FIG. 3 is a diagram of a reproducing portion of the present transport stream recording and reproducing apparatus according to an embodiment of the present invention.

The reproducing portion of the transport stream recording and reproducing apparatus 1 may include a reproduction circuit 12, an error correction code (ECC) circuit 13, a time stamp separation circuit 14, a transport packet encoder 15, a clock generation circuit 16, a timing generation circuit 17, a comparison circuit 18, an output control circuit 19, and a central processing unit (CPU) 21 as arranged in FIG. 3.

The reproduction circuit 12 may read a data stream (which may conform to an MPEG standard or the like) recorded in the storage medium 11 and may provide the read data stream to the ECC circuit 13 wherein an error correction may be performed thereon. An error corrected partial transport stream may be supplied from the ECC circuit 13 to the time stamp separation circuit 14 so as to separate the added time stamp from each packet in the received partial transport stream. Annexed information and maximum bit rate information recorded in the storage medium 11 may be supplied from the ECC circuit 13 to the transport packet encoder 15 wherein such received information may be assembled into packets. The annexed information and maximum bit rate information may also be supplied from the ECC circuit 13 to the CPU 21. Alternatively, the CPU 21 may receive such annexed information and/or maximum bit rate information from another circuit or external device by way of terminal 30. The CPU 21 may form control signals in accordance with the received information and may supply the same to a control terminal 22 for supply to the IEEE 1394 interface.

The clock generation circuit 16 which may include a crystal device (such as a 27 MHz crystal) may generate a clock signal having a predetermined frequency (such as 27 MHz) in a free-run manner and may supply the same to the timing generation circuit 17. The timing generation circuit 17 may count clocks or pulses of the received clock signal from the initial or first time stamp separated by the time stamp separation circuit 14 and may supply the obtained count value to the comparison circuit 18. The comparison circuit 18 may compare a time stamp separated by the time stamp separation circuit 14 and the count value from the timing generation circuit 17. The output control circuit 19 may supply each packet in the partial transport stream in which the time stamp has been separated therefrom to terminal 20 at a time(s) in accordance with the comparison result supplied from the comparison circuit 18.

A reproduction operation involving the transport stream recording and reproducing apparatus 1 will now be described.

To reproduce a partial transport stream recorded in the storage medium 11, the reproduction circuit 12 may initially read annexed information and/or maximum bit rate information from the portion(s) of the storage medium 11 in which such information is stored (such as the TOC). The read annexed information and/or maximum bit rate information may be error-corrected by the ECC circuit 13 and then supplied to the CPU 21. Alternatively, the CPU 21 may receive such information from another circuit or external device by way of terminal 30. The CPU 21 may generate a control signal based on the received information and supply the same by way of the terminal 22 to the IEEE 1394 adapter 104 (FIG. 5).

Figure 4:
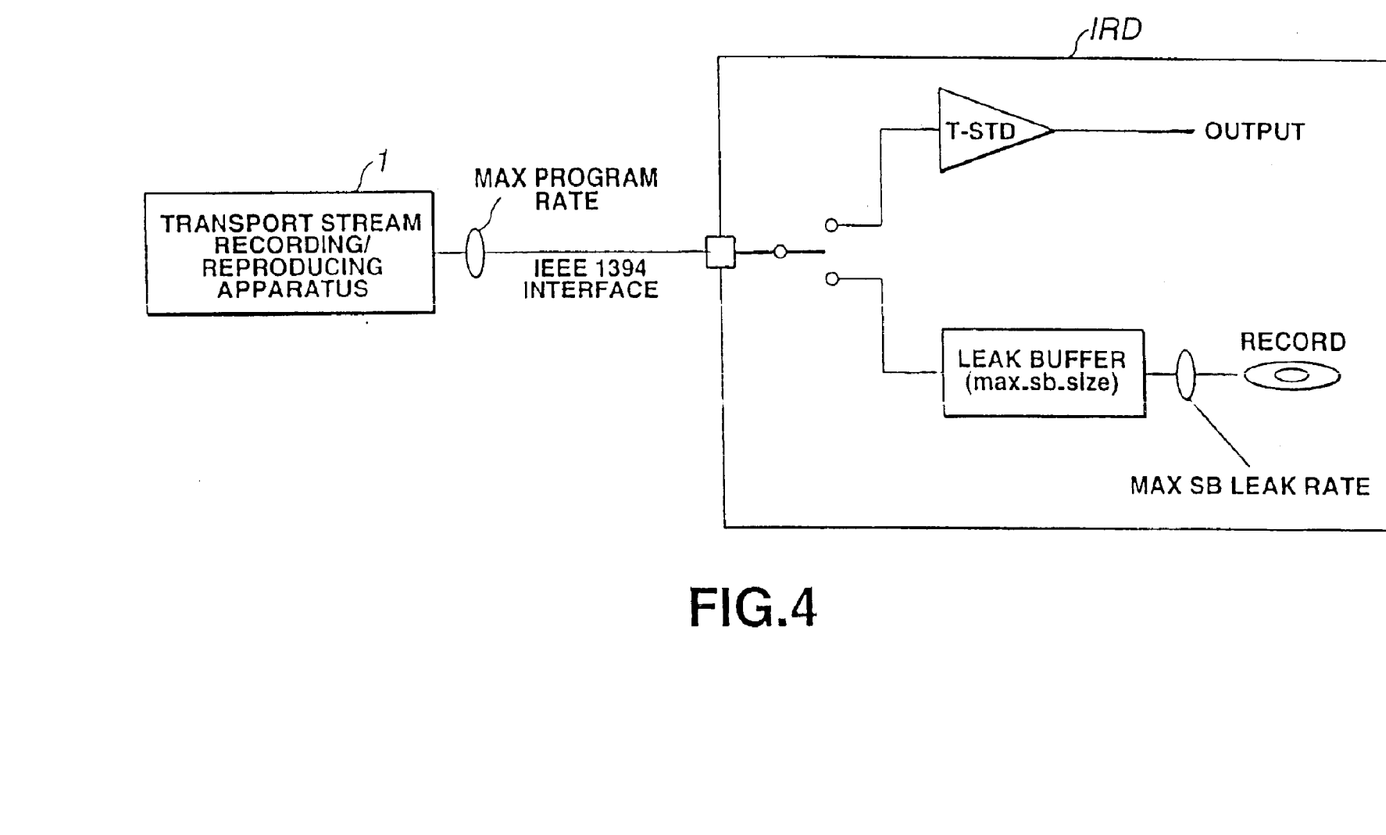
FIG. 4 illustrates a receiver which may receive and/or transfer a transport stream from and/or to the present transport stream recording and reproducing apparatus by way of an IEEE 1394 interface.

The max_sb_leak_rate, max_sb_size and max_program_rate annexed information may be supplied to the IRD by way of the IEEE 1394 interface and used for the transfer of a transport stream recorded in the storage medium 11 in the IEEE 1394 isochronous mode. For example, and with reference to FIG. 4, the max_program_rate may indicate a bit rate for the IEEE 1394 isochronous transfer, the max_sb_size may indicate a leak buffer size for the receiving side to record the transport stream, and the max_sb_leak_rate may indicate an output bit rate from the leak buffer which is the maximum recording bit rate for the receiving side.

The maximum bit rate information may be supplied to the IEEE 1394 adapter 104 coupled to the transport stream recording and reproducing apparatus 1. Such IEEE 1394 adapter may reserve or set a band width or rate for data transfer over the digital interface according to the maximum bit rate information. For example, such adapter may reserve or set a data transfer rate of 5 Mbps when the maximum bit rate is 5 Mbps, or a data transfer rate of 7 Mbps when the maximum bit rate is 7 Mbps, or a data transfer rate of 9.5 Mbps when the maximum bit rate is 9.5 Mbps, and so forth.

The annexed information and/or maximum bit rate information may also be supplied to the transport packet encoder 15 wherein such information may be assembled and/or encoded into transport packets. The max_program_rate may be encoded to a transport packet having a maximum_bitrate_descriptor as defined in ISO/IEC 13818-1. The transport packets may be supplied to the output control circuit 19 and may be transmitted therefrom to the outside before the output or transmission of a transport stream of an AV (audio video) program. Alternatively, the transport packets may be transmitted during the AV program transmission. In either case, a data transfer rate which is sufficient for the transmission of the transport packets (which may have the annexed information and/or maximum bit rate information) may be reserved for data transfer over the digital interface. Further, when the AV program bit rate is lower than the rate reserved for date transfer over the digital interface and as such more data can be transmitted over the digital interface during the time in which an AV program is transmitted at the low bit rate, the transport packets (having the annexed information and/or maximum bit rate information) may be transmitted over the digital interface.

The transport stream read from the storage medium 11 by the reproduction circuit 12 is error-corrected by the ECC circuit 13 and supplied to the time stamp separation circuit 14 wherein it may be separated into a number of transport packets and time stamps. The transport packet(s) may be supplied to the output control circuit 19 and the time stamp(s) may be supplied to the comparison circuit 18 and the timing generation circuit 17. The timing generation circuit 17 having a counter may count clock pulses of the 27 MHz clock signal generated by the clock generation circuit 16 from the initial time stamp or value and may provide such count to the comparison circuit 18 which, in turn, may compare the time stamp supplied from the time stamp separation circuit 14 and the count value supplied from the timing generation circuit 17. When such time stamp and count value coincide, the comparison circuit 18 may control the output control circuit 19 to deliver to terminal 20 the transport packets supplied from the time stamp separation circuit 14. As such, the transport packets Ai may be provided in the same timing arrangement as that in which they had been encoded. As a result, the above-described failures of the T-STD may be prevented.

The partial transport stream provided from the transport stream recording and reproducing apparatus 1 may be isochronously transferred from the IEEE 1394 adapter coupled to the transport stream recording and reproducing apparatus 1 (such as IEEE 1394 adapter 104) to the IRD-side IEEE 1394 adapter (such as IEEE 1394 adapter 103). The IRD-side IEEE 1394 adapter may supply the received transport stream to the IRD wherein the same may be decoded so as to reproduce the video and/or audio signals.

As described above, during a recording operation, the present invention may detect or determine the maximum bit rate of a transport or multiplexed stream and write such stream and its maximum bit rate onto a recording medium. During a reproduction operation, the present invention may read the transport or multiplexed stream and its maximum bit rate from the recording medium and may reserve or set a band width or rate of data transfer over a digital interface based on the read maximum bit rate. As a result of the set band width or data transfer rate, the digital interface band may be utilized for transferring data with a relatively high efficiency.

Thus, the present invention can reserve or set a rate of data transfer over the digital interface which efficiently utilizes the digital interface band.

Although as described herein the present invention has been applied to or incorporated into a recording and/or reproducing apparatus, the present invention is not so limited and may be applied to or incorporated into other types of apparatus.

Further, although as described herein the transport stream recording and reproducing apparatus 1 is separate from an IEEE adapter (such as the IEEE 1394 adapter 104), the present invention is not so limited. As an alternative, such IEEE 1394 adapter may be included in the transport stream recording and reproducing apparatus.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. An apparatus for reproducing data from a recording medium, said apparatus comprising:
    means for reproducing a data stream from said recording medium;
    means for obtaining maximum bit rate information of said data stream;
    means for setting a transmission band width in accordance with information indicative of the maximum bit rate of said data stream;
    means for outputting said data stream within the set band width;
    time stamp separation means for separating a time stamp from said data stream;
    clock generating means for generating a reference clock signal and for counting pulses thereof;
    comparison means for comparing said time stamp and the counted pulse value; and
    output control means for controlling the output of said data stream in response to a comparison result from said comparison means.

2. A method for reproducing data from a recording medium, said method comprising the steps of:
    reproducing a data stream from said recording medium;
    obtaining maximum bit rate information of said data stream;
    setting a transmission band width in accordance with information indicative of the maximum bit rate of said data stream; and
    outputting said data stream within the set band width;
    separating a time stamp from said data stream;
    generating a reference clock signal and counting pulses thereof;
    comparing said time stamp and the counted pulse value; and
    controlling the output of said data stream in response to the comparison result.

3. An apparatus for reproducing data from a recording medium, said apparatus comprising:
    a circuit which reproduces a data stream and maximum bit rate information of said data stream from said recording medium;
    an adapter which sets a transmission band width in accordance with information indicative of the reproduced maximum bit rate of said data stream;
    a circuit which outputs said data stream within the set band width;
    a time stamp separation circuit which separates a time stamp from said data stream;
    a clock generating and counter circuit which generates a reference clock signal and counts pulses thereof;
    a comparison circuit which compares said time stamp and the counted pulse value; and
    an output control circuit which controls the output of said data stream in response to a comparison result from said comparison circuit.

* * * * *

UNITED STATES PATENT AND TRADEMARK OFFICE
CERTIFICATE OF CORRECTION

PATENT NO.    : 6,956,869 B1  Page 1 of 1
DATED         : October 18, 2005
INVENTOR(S)   : Motoki Kato

It is certified that error appears in the above-identified patent and that said Letters Patent is hereby corrected as shown below:

Column 2,
Line 55, change "data," to -- data --.

Column 10,
Line 24, change "PCR(i)()3)" to -- PCR(i))...(3) --.

Signed and Sealed this

Eighteenth Day of April, 2006

JON W. DUDAS
*Director of the United States Patent and Trademark Office*